US011135780B2

(12) United States Patent
Yamaura et al.

(10) Patent No.: US 11,135,780 B2
(45) Date of Patent: Oct. 5, 2021

(54) WELDING APPARATUS

(71) Applicant: Nagano Automation Co., Ltd., Nagano (JP)

(72) Inventors: Seiji Yamaura, Nagano (JP); Hirotaka Kojima, Nagano (JP)

(73) Assignee: Nagano Automation Co., Ltd., Nagano (JP)

( * ) Notice: Subject to any disclaimer, the term of this patent is extended or adjusted under 35 U.S.C. 154(b) by 1 day.

(21) Appl. No.: 16/607,315

(22) PCT Filed: Nov. 28, 2018

(86) PCT No.: PCT/JP2018/043778
§ 371 (c)(1),
(2) Date: Oct. 22, 2019

(87) PCT Pub. No.: WO2019/107408
PCT Pub. Date: Jun. 6, 2019

(65) Prior Publication Data
US 2020/0079029 A1    Mar. 12, 2020

(30) Foreign Application Priority Data

Nov. 30, 2017   (JP) .............................. JP2017-230045

(51) Int. Cl.
*B29C 65/20*    (2006.01)
*B29C 65/00*    (2006.01)
(Continued)

(52) U.S. Cl.
CPC ........ *B29C 65/20* (2013.01); *B29C 66/00145* (2013.01); *H01M 50/116* (2021.01); *H01M 50/124* (2021.01); *B29L 2031/3468* (2013.01)

(58) Field of Classification Search
CPC ........ B29C 2043/3261; B29C 48/2665; B29C 66/8185; B29C 65/20
USPC .......................................... 156/500
See application file for complete search history.

(56) References Cited

U.S. PATENT DOCUMENTS 5,205,899 A      4/1993   Woodman, Jr.
2008/0105379 A1*  5/2008   Yamamoto ........ H01J 37/32348
                                            156/345.43

FOREIGN PATENT DOCUMENTS

JP    2003170499 A    6/2003
JP    2009166487 A    7/2009
(Continued)

OTHER PUBLICATIONS

English Translation of Kenichi (JP2011181390) (Year: 2011).*
(Continued)

*Primary Examiner* — Matthew J Daniels
*Assistant Examiner* — Hana C Page
(74) *Attorney, Agent, or Firm* — Blank Rome LLP

(57) ABSTRACT

There is provided an apparatus 1 that includes a pair of molds 10a and 10b that press together, heat, and weld an overlapping part of a plurality of film-like members, a pair of heater blocks 20a and 20b that respectively support the pair of molds; a plurality of first support blocks 37 that are connected via a plurality of rod-like members 50, which midway include parts that restrict transmission of heat, to one heater block 20a; a plurality of second support blocks 38 that are connected via the plurality of rod-like members to the other heater block 20b; and a driving mechanism 60 that changes, via the support blocks, a gap between the pair of molds to press together the film-like members. The plurality of first support blocks include at least one movable support block 39 including a mechanism 35 that moves in a first direction relative to the driving mechanism corresponding to (Continued)

thermal deformation in the first direction of the heater block to be supported, and the plurality of second support blocks include at least one movable support block 39.

10 Claims, 2 Drawing Sheets

(51) Int. Cl.
*H01M 50/116* (2021.01)
*H01M 50/124* (2021.01)
*B29L 31/34* (2006.01)

(56) References Cited

FOREIGN PATENT DOCUMENTS

| JP | 2011181390 A | 9/2011 |
| JP | 2012044145 A | 3/2012 |
| JP | 2013082489 A | 5/2013 |

OTHER PUBLICATIONS

English Translation of Musha (JP2013082489) (Year: 2013).*
English Translation of Kainuma (JP2003095673A) (Year: 2003).*
International Search Report for PCT/JP2018/043778, dated Feb. 12, 2019, 1 page.
International Preliminary Report on Patentability for PCT/JP2018/043778, dated Jun. 2, 2020, 7 pgs.

* cited by examiner

WELDING APPARATUS

RELATED APPLICATIONS

This application is a national phase of PCT/JP2018/043778, filed on Nov. 28, 2018, which claims priority to Japanese Patent Application No. 2017-230045, filed on Nov. 30, 2017. The entire contents of these applications are hereby incorporated by reference.

TECHNICAL FIELD

The present invention relates to an apparatus that welds together film-like members.

BACKGROUND ART

In Japanese Laid-open Patent Publication No. 2011-181390, the provision of a welding apparatus capable of precisely maintaining both pressure and temperature distribution is described. The apparatus disclosed in this publication includes a pair of molds for at least partially welding an overlapping part of a plurality of film-like members, and a pair of support units that respectively support the pair of molds. Each support unit includes a heater block, which is made of metal, incorporates a heater, and has a mold attached to one side, and a support block, which is joined to the heater block via a plurality of rod-like members. Each of the rod-like members is made of metal, and the rod-like members are shaped so as to narrow in the middle and arranged so as to be spaced from each other.

SUMMARY OF THE INVENTION

There is provided a battery cell that uses film-like members (or "laminated films"), in which a metal layer (metal film, metal thin film) and a resin layer are stacked, in a battery case. In the manufacturing process for a laminated cell, the battery case is manufactured with two film-like members (laminated films) arranged so that their respective resin layers are on the inside and the resin layers are thermally welded (thermally adhered) together around the periphery to combine (join) the two film-like members.

In recent years, the capacity and physical size of cells have increased, resulting in a tendency for battery cases to also become larger. There are also strict demands regarding the heating precision (that is, the precision of inputting heat) of welded portions when laminated films are welded to manufacture a battery case. This means that there is demand for an apparatus where the pair of molds that press together the film-like members for welding purposes are longer to cope with the increase in physical size, and where there is little deformation, such as warping, so that a highly precise shape can be maintained.

One aspect of the present invention is an apparatus (welding apparatus) that welds together a plurality of film-like members and includes: a pair of molds that extend in a first direction and sandwich and heat an overlapping part of the plurality of film-like members to at least partially weld the overlapping parts together; and a pair of heater blocks that extend in the first direction and respectively support the pair of molds. The apparatus further includes a plurality of first support blocks that are disposed intermittently on the first direction and are connected via a plurality of rod-like members to one heater block out of the pair of heater blocks; and a plurality of second support blocks that are disposed intermittently on the first direction and are connected via the plurality of rod-like members to another heater block out of the pair of heater blocks. The respective rod-like members extend in a direction that is perpendicular to the first direction and midway include parts that restrict transmission of heat, for example, parts that narrow midway. The apparatus further includes a driving mechanism that changes, via the plurality of first support blocks and the plurality of second support blocks, a distance (gap) between the pair of molds to press together the film-like members. The plurality of first support blocks include at least one movable support block including a mechanism that moves in the first direction relative to the driving mechanism corresponding to thermal deformation in the first direction of the heater block to be supported, and the plurality of second support blocks include at least one movable support block.

One method of precisely maintaining the shape of a pair of molds that extend in a first direction may be to support the molds along the first direction using separate support blocks that are highly rigid and extend along the first direction. However, when this method is used, if the length of the molds is increased, the support blocks for providing support also become longer, and even if the transmission of heat between the molds, which reach a high temperature, and the support blocks is restricted, use of the molds for an extended period will result in the temperature of the support blocks also rising. The inventors of the present application found that this means that thermal deformation of the support blocks will also increase in keeping with the rise in temperature, and as a result, the molds supported by the support blocks will also deform.

It is possible to insert a mechanism, as one example, a slide mechanism, that moves in the first direction relative to the driving mechanism when the support blocks have thermally deformed and expanded in the first direction. However, it may be difficult to ensure that this mechanism will operate smoothly when the thermal deformation of the support blocks has increased.

For this reason, in the apparatus according to the present invention, by disposing the plurality of support blocks intermittently on (spread out in) the first direction, it is possible to limit the connecting parts between the heater blocks and the support blocks, and to connect the individual support blocks and the heater blocks via the rod-like members that midway include parts that restrict the transfer of heat. In addition, some or all of the support blocks out of the plurality of support blocks are constructed as movable support blocks that include a mechanism that moves in the first direction relative to the driving mechanism corresponding to thermal deformation in the first direction of the heater block to be supported. It is possible to support the heater block stably using a plurality of support blocks and, by splitting the support blocks into smaller blocks and further suppressing the flow of heat, to suppress thermal deformation. This means that it is possible to provide an apparatus that can be equipped with movable support blocks which are equipped with a mechanism of a simple configuration and which stably move in the first direction, therefore, the apparatus where the heater blocks are capable of stably expanding in the first direction can be provided. Accordingly, it is possible to provide a welding apparatus that includes molds that are long in the first direction, in which warping, deflection and the like is reduced, and are capable of applying pressure more uniformly to the film-like members to be welded together.

Each support block in the plurality of first support blocks and the plurality of second support blocks may be connected by the plurality of rod-like members that are arranged at three or four locations that are spread out. The plurality of first support blocks may be composed of two or three support blocks that include the movable support blocks, and the plurality of second support blocks may be composed of two or three support blocks that include the movable support blocks.

The overall length Lh of one heater block out of the pair of heater blocks and a sum total length Ls of the plurality of the support blocks corresponding to this heater block, for example, the plurality of first support blocks, may satisfy a condition below.

$$0.05 < Ls/Lh < 0.5 \tag{1}$$

It is desirable for the total length Ls of the plurality of support blocks to be short so as to reduce the influence of thermal deformation (thermal expansion). On the other hand, when the total length is too short, it becomes difficult to move the heater blocks and molds via the support blocks in order to apply pressure. The upper limit of Condition (1) may be 0.3, or may be 0.25. The lower limit of Condition (1) may be 0.07, may be 0.1, or may be 0.15.

The apparatus may further include a vacuum vessel that houses the pair of molds, the pair of heater blocks, and the plurality of first and second support blocks.

DESCRIPTION OF EMBODIMENTS

Figure 1:
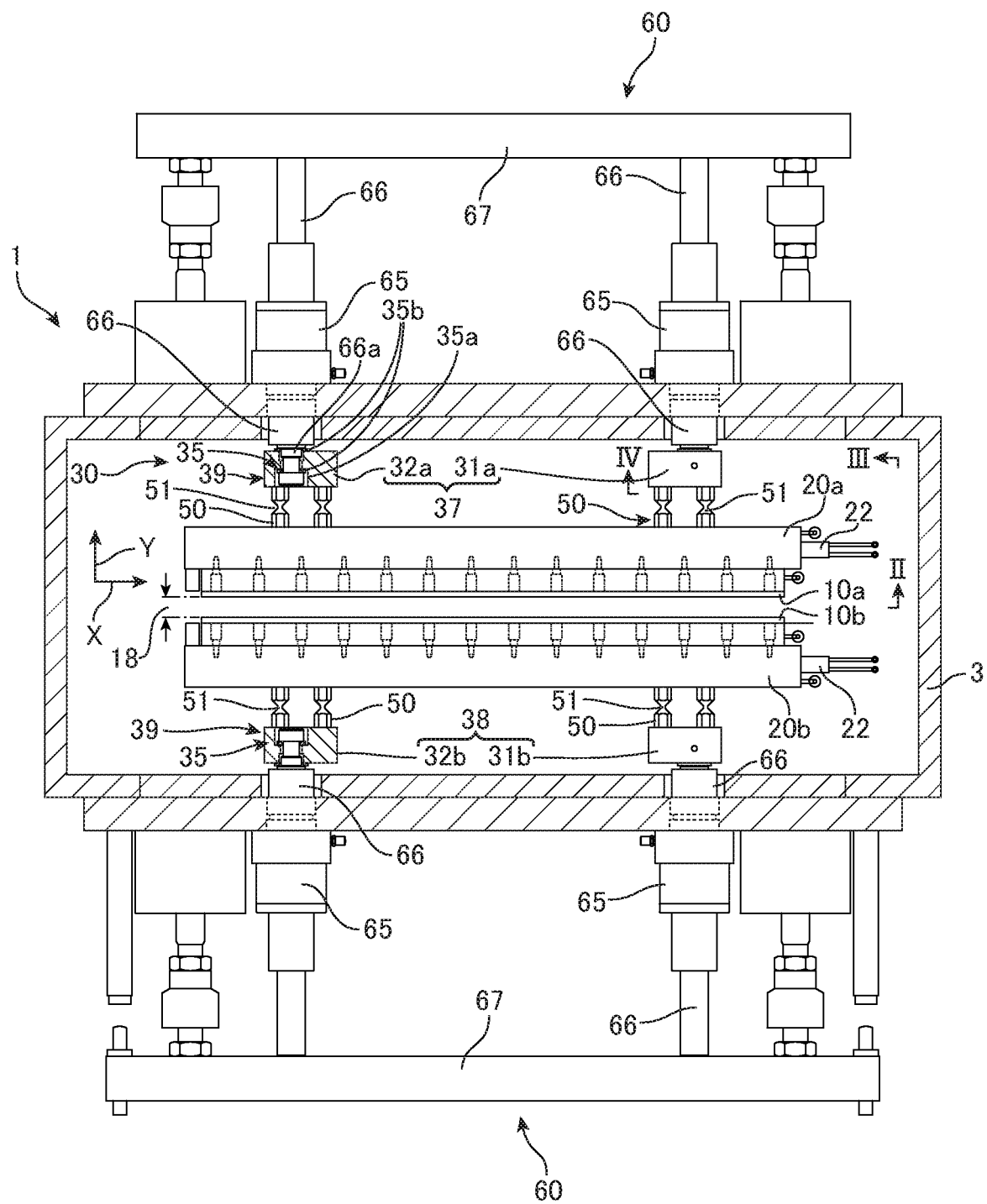
FIG. 1 is a plan view depicting a welding apparatus according to an embodiment of the present invention.

FIG. 1 depicts one example of a welding apparatus 1 viewed from above. This welding apparatus 1 manufactures a laminated pack by placing two film-like members (or "laminated films" or "films") so as to overlap each other and partially welding the members together.

The welding apparatus 1 includes a pair of molds 10a and 10b that extend in a first direction (X direction, length direction), a pair of heater blocks 20a and 20b that respectively support the pair of molds 10a and 10b, and a plurality of support blocks 30 that are disposed intermittently on (arranged so as to be spread out in) the first direction X and transmit forces that press the pair of molds 10a and 10b via the heater blocks 20a and 20b. The support blocks 30 of the welding apparatus 1 according to the present embodiment include two left-right pairs of support blocks 31a and 31b, and 32a and 32b. The support blocks 31a and 32a are included in a plurality of first support blocks 37 that support one block (20a) out of the pair of heater blocks 20a and 20b. The support blocks 31b and 32b are included in a plurality of second support blocks 38 that support the other block (20b) out of the pair of heater blocks 20a and 20b. The support blocks 32a and 32b are movable support blocks 39 that include a mechanism (moving mechanism) 35 which moves in a limited range in the length direction X, and are illustrated by way of cross-sectional view schematically depicting the internal configuration.

Note that relating to the pair of molds 10a and 10b, the pair of heater blocks 20a and 20b, the pair of left-right support blocks 31a and 31b, and the pair of blocks 32a and 32b, since each of the pairs has the same configurations, when describing the detailed configuration or construction, reference is made to one mold 10a, one heater block 20a, and one pair of blocks 31a and 32a.

The welding apparatus 1 includes a plurality of rod-like members 50 that extend in a direction (Y direction) that is perpendicular to the first direction (X direction) so as to connect the support blocks 31a and 32a, out of the plurality of support blocks 30, and the heater block 20a. The individual rod-like members 50 include parts 51 positioned midway that restrict the transmission of heat. The heater block 20a is supported by four rod-like members 50 laid out in the left, right, up, and down directions on each of the support blocks 31a and 32a. One example of rod-like members 50 that include parts 51 that restrict the transmission of heat are metal members shaped so that the parts 51 positioned midway that restrict the transmission of heat have a reduced area.

In more detail, the rod-like members 50 in the present embodiment are each formed of two truncated cones or truncated pyramids that narrow toward the heat transmission-restricting part 51 in the center and are joined at the center. Due to the restricted (reduced) area of the center (middle, midway) part 51 where the cross-sectional area narrows, the cross-sectional area required to transmit heat is reduced and the transmission of heat is restricted. Instead of the center parts 51 of the rod-like members 50 having a reduced cross-sectional area, or in addition to reducing the cross-sectional area, it is also possible to interpose a material with superior heat insulating properties. The rod-like members 50 according to the present embodiment which are configured to restrict the transmission of heat using a single material, and in particular a metal material, are a favorable example of members that have a simple configuration and can precisely transmit a pressing force.

The welding apparatus 1 further comprises a vacuum vessel 3, which houses the pair of molds 10a and 10b, the pair of heater blocks 20a and 20b, and the left-right pairs of support blocks 31a and 31b and 32a and 32b, and a driving mechanism 60 that changes the distance (gap) between the pair of molds 10a and 10b via the plurality of support blocks 31a, 31b, 32a, and 32b to press the film-like members together. The driving mechanism 60 includes a plurality of shafts 66, which are disposed so as to pass through the wall of the vacuum vessel 3 via bushings 65 and are connected to the respective support blocks 31a to 32b, and a pair of driving bars 67 that drive the plurality of shafts 66 from outside the vacuum vessel 3. In the present embodiment, one of the driving bars 67 is fixed and the other driving bar 67 is pushed and pulled via a pressing mechanism (not illustrated) such as a hydraulic cylinder or an air cylinder to change, via the support blocks 31a to 32b and the pair of heater blocks 20a and 20b, the gap between the pair of molds 10a and 10b, thereby pressing together and applying pressure to the films. To get better insulating properties against heat, the shafts 66 may be constructed so that an appropriate insulating material is interposed.

The driving mechanism (driving apparatus) 60 is not limited to the configuration described in the present embodiment and it is sufficient for the driving mechanism 60 to be constructed so as to be capable of causing the pair of molds 10a and 10b to move relative to each other via the plurality of support blocks 30 to control the gap (distance) 18 between the molds 10a and 10b and apply pressure to the film-like members sandwiched between the molds 10a and 10b. In more detail, it is sufficient for the driving mechanism 60 to be capable of controlling the position of the mold 10a via the support blocks 31a and 32a of the plurality of first support blocks 37 that are arranged so as to be spread out in the first direction (X direction) relative to one heater block 20a and the mold 10a, and capable of controlling the position of the mold 10b via the support blocks 31b and 32b of the plurality of second support blocks 38 that are arranged so as to be spread out in the first direction (X direction) relative to the other heater block 20b and mold 10b.

Figure 2:
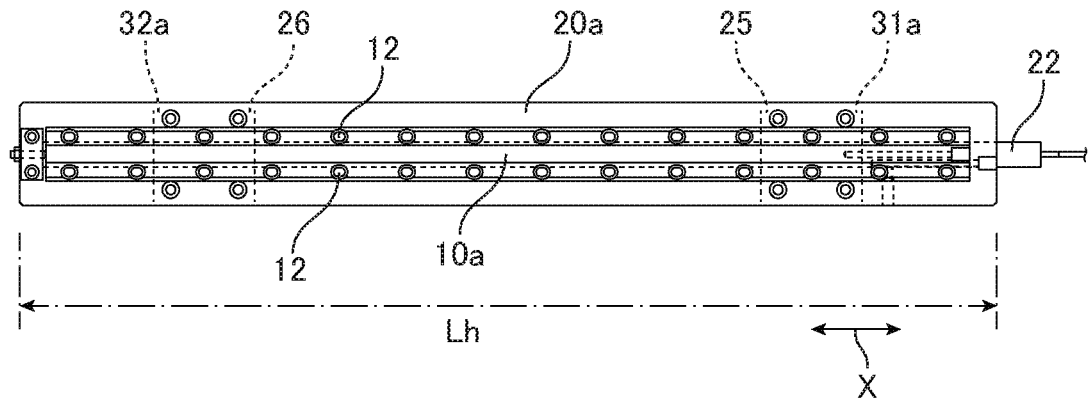
FIG. 2 depicts a state where a mold and a heater block are viewed from the front.
Figure 3:
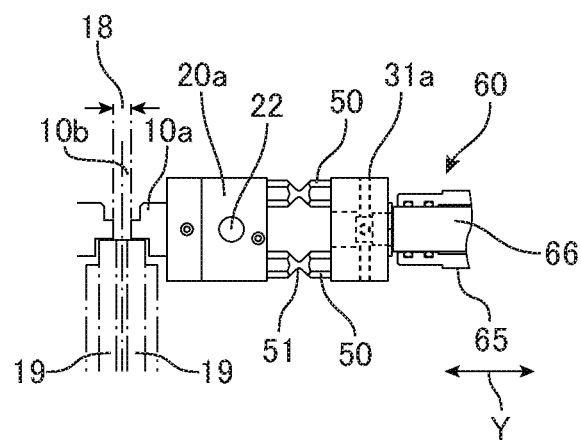
FIG. 3 depicts a state where the mold, the heater block, and a support block are viewed from the side.
Figure 4:
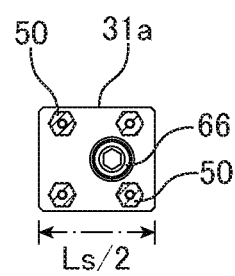
FIG. 4 depicts a state where the support block is viewed from the front.

FIG. 2 depicts the mold 10a and the heater block 20a when looking from the front (Y direction or "II direction"). FIG. 3 depicts how the mold 10a and the heater block 20a are connected to the support block 31a by the rod-like members 50 when looking from the side (X direction or "III direction"). FIG. 4 depicts the support block 31a when looking from the front (Y direction or "IV direction").

The mold 10a is attached to the front of the heater block 20a and, as depicted by the broken line in FIG. 3, sandwiches, presses, and heats a part where the film-like members 19 are overlapping in the gap 18 between the mold 10a and the mold 10b to weld the film-like members 19 together. The heater block 20a is a metal member that is rectangular in cross section and extends in the X direction (first direction) in the same way as the mold 10a. A heater 22 is inserted along the length direction X into the center of the heater block 20a. The heater block 20a heats the mold 10a to the temperature required for welding and also has a function as a heat sink and a function as a support member that supports the mold 10a. The mold 10a is fixed to the heater block 20a using screws (bolts) 12 arranged so as to be spread out in the X direction and by interposing shim rings, it is possible to make adjustments to keep the mold 10a straight on the heater block 20a.

The heater block 20a is connected to and supported by the plurality of first support blocks 37, which include the support blocks 31a and 32a that are disposed intermittently at two left and right positions in the X direction, at two positions (contacting parts, connecting parts) 25 and 26 that are spread out at two left and right positions in the X direction. The support blocks 31a and 32a are connected to the driving mechanism 60, or in more detail, to the shafts 66 of the driving mechanism 60. Pressure is applied to the support blocks 31a and 32a by the shafts 66 that move with synchronized timing and force. As a result, the heater block 20a moves (is pressed) in the Y direction via the support blocks 31a and 32a, the mold 10a heated by the heater block 20a is moved, and the film-like members 19 sandwiched in the gap 18 between the opposing molds 10a and 10b are welded together.

The heater block 20a and each of the support blocks 31a and 32a are connected by four rod-like members 50 that are arranged in the up, down, left, and right directions. The rod-like members 50 have a structure 51 that restricts the transmission of heat, so that although the pressing force applied by the driving mechanism 60 is favorably transmitted to the heater block 20a, heat from the heater block 20a is hardly transmitted to the support blocks 31a and 32a. In the welding apparatus 1 according to the present embodiment, the overall length Lh in the X direction of the heater block 20a may be 550 mm and the lengths in the X direction of the support blocks 31a and 32a may be both 65 mm. Accordingly, the total length Ls of the support blocks 31a and 32a may be 130 mm, which means that Ls/Lh is 0.24, which satisfies Condition (1).

In the welding apparatus 1, the overall length of the heater block 20a may be 550 mm, which is substantially equal to the overall length of the mold 10a and makes it possible to weld film-like members 19 that are around 500 mm wide. This means that it is possible to weld a large battery pack using the welding apparatus 1 and that the welding apparatus 1 is suited to manufacturing large capacity batteries. When the heater block 20a is made longer, the increase in the length direction (X direction, first direction) of the heater block 20a due to thermal expansion (thermal deformation) as the temperature rises also increases. Accordingly, if the heater block 20a were supported by a single support block, the stress in the heater block 20a would vary according to a temperature difference and/or difference in thermal expansion coefficients with the support block, resulting in the risk of the shape of the heater block 20a becoming unstable. In addition, when a support block that is long in the X direction is connected to the heater block 20a by rod-like members 50 that restrict transfer of heat so as to prevent thermal deformation of the support block, the difference in speed between the change in temperature of the support block and the change in temperature of the heater block 20a will increase, which makes it difficult to stabilize the shape of the heater block 20a.

For this reason, in the welding apparatus 1, firstly, the entire heater block 20a is not supported by support blocks, the support blocks 30 are disposed intermittently or arranged so as to be spread out, and the contact areas of the contacting parts 25 and 26 between the heater block 20a and the support blocks are limited to a minimum area (in two dimensions) that is still capable of stably transmitting the pressing force. In addition, the heater block 20a and the support blocks 31a and 32a are connected by the rod-like members 50 which are limited in number and which transmit only a small amount of heat. By doing so, it is possible to minimize the amount of heat that flows from the heater block 20a to the support blocks 31a and 32a and possible to suppress a drop in temperature at the contacting parts 25 and 26 of the heater block 20a.

In the present embodiment, one support block 31a is connected to the heater block 20a by four rod-like members 50 that are arranged in two dimensions and spread out at four positions, so that it is possible to transmit pressure to the heater block 20a in a state where the posture of the support block 31a with respect to the heater block 20a is maintained. The support block 31a may be connected to the heater block 20a by three rod-like members 50 that are arranged in two dimensions and spread out at three positions. Although it is also possible to connect the support block 31a using five or more rod-like members 50 that are arranged in two dimensions and spread out at five or more positions, when the number of rod-like members 50 is increased, there is a tendency for the amount of heat that flows from the heater block 20a to the support block 31a to increase, which makes it easier for a temperature difference to occur in the heater block 20a. The support block 31a itself also increases in size and becomes susceptible to rises in temperature, which increases the risk of deformation due to heat.

By making the support blocks 31a and 32a smaller and connecting to the heater block 20a using the minimal rod-like members 50, it is possible to reduce the amount of heat (heat flow) that flows out from the heater block 20a to the support blocks 31a and 32a. Accordingly, it is possible to perform control, using the heater 22 inserted into the length direction (X direction, first direction) of the heater block 20a, to make the temperature distribution in the length direction X of the heater block 20a more constant (i.e., more uniform). This means that it is possible to cause the heater block 20a to deform as uniformly as possible in the length direction X, to suppress the generation of stress due to a rise in temperature, and to thereby suppress warping, bending, and other deformation into an unexpected shape of the heater block 20*a* due to a rise in temperature.

In addition, since the support blocks 31*a* and 32*a* are arranged so as to be spread out in the length direction (or "X direction") of the heater block 20*a*, the respective lengths of the support blocks 31*a* and 32*a* can be reduced. This means that it is possible to suppress the amount of thermal deformation (or thermal expansion) of the individual support blocks 31*a* and 32*a* due to the temperature, and to avoid the generation of stress in the length direction X in a range where the function of transmitting the pressing force by the rod-like members 50 can be maintained. Accordingly, the influence on the heater block 20*a* of deformation that does occur due to the rise in temperature of the support blocks 31*a* and 32*a* can be minimized.

Further to the above, in the welding apparatus 1 according to the present embodiment, the support block 32*a* that is one of the first support blocks 37 is a movable support block 39 that is capable of moving and has an incorporated mechanism (moving mechanism, slide mechanism) 35 for moving in the length direction X relative to the shaft 66 of the driving mechanism 60. Due to this slide mechanism 35, the support block 32*a* autonomously moves with respect to the shaft 66 in the length direction X corresponding to thermal expansion in the length direction X of the heater block 20*a*. Accordingly, the heater block 20*a* is supported by the support blocks 31*a* and 32*a* so that the heater block 20*a* itself thermally deforms and expands in the length direction X. This means that it is possible to suppress the generation of stress in the heater block 20*a*, to further stabilize the heater block 20*a*, and to cause uniform thermal deformation in the length direction X. As a result, it is possible to keep the mold 10*a* straight even if the temperature of the mold 10*a* changes.

As described earlier, in the same way as the other support blocks 30, since the movable support block 39 is small and is connected to the heater block 20*a* by the rod-like members 50, there is little inflow of heat, so that the support block 39 is not susceptible to thermal deformation. When carbon steel or the like is used as the heater block 20*a*, the increase in length due to thermal deformation is estimated to be around several mm. Accordingly, by using the moving mechanism 35 that has a simple construction, it is possible to make each support block 39 movable with respect to the shaft 66 of the driving mechanism 60. In the present embodiment, as the sliding mechanism 35, a construction is used where a front end 66*a* of a shaft 66 has a stepped structure (multistage structure, two-staged structure) and is inserted into a hole 35*a* that also has a stepped structure (multistage structure, two-staged structure) and is provided in the support block 39, with the stepped parts (circumferentially extended staged parts) sliding in the length direction X via a washer 35*b* equipped with a shim ring. The hole 35*a* is a round hole or slot with a size (diameter) decided with consideration to the amount of movement with respect to the diameter of the front end 66*a*. Due to the front ends 66*a* of the shafts moving in the length direction X inside the holes 35*a*, it is possible for the support blocks 39 to slide in the length direction X with respect to the shafts 66. The positions in the Y direction of the support blocks 39 relative to the shafts 66 can be freely adjusted by changing the thickness or number of the washers 35*b* that are also used as shim rings, which makes it possible to finely adjust the inclination in the length direction X of the mold 10*a* via the heater block 20*a*. The mechanism 35 incorporated in the movable support block 39 is not limited to this example and may be any configuration capable of moving in the length direction X. It is also possible to use a slide rail or other known mechanism.

In this way, in the welding apparatus 1, instead of suppressing deformation of the heater block 20*a*, the heater block 20*a* is caused to deform uniformly in the length direction X when the heater block 20*a* is heated. As a result, the mold 10*a* becomes free from warping and other deflection due to changes in temperature of the mold 10*a* and it is possible to keep the mold 10*a* straight. In addition, since it is possible to suppress the amount of heat that moves from the heater block 20*a* to the support blocks 31*a* and 32*a*, it is possible to suppress variations in the temperature distribution in the length direction X of the heater block 20*a*. This means that it is possible to suppress the occurrence of deformation, such as warping, that is difficult to control and facilitate uniform deformation of the heater block 20*a* in the length direction X. This also means that it is possible to prevent warping due to temperature changes in the mold 10*a*.

To suppress thermal deformation of the support blocks 30, it is desirable for the sum total length of the plurality of first support blocks 37 that support the heater block 20*a*, that is, the total length Ls of the support blocks 31*a* and 32*a* in the present embodiment to be as short as possible. On the other hand, when force is applied in a pinpoint manner to the heater block 20*a*, this can cause deformation, such as distortion, of the heater block 20*a*, resulting in the risk of the mold 10*a* supported by the heater block 20*a* becoming less straight. Accordingly, it is desirable for the individual support blocks 31*a* and 32*a* out of the plurality of first support blocks 37 to apply the force from the driving mechanism 60 to the heater block 20*a* in a distributed manner but to an extent where distortion of the heater block 20*a* due to the transmitted forces (pressing forces) is suppressed. For this reason, it is preferable for the number of support blocks 30 included in the first support blocks 37 that support one heater block 20*a* to be the lowest possible number that is two or more. As one example, it is desirable for the number to be three or lower.

It is also desirable for the number of the rod-like members 50 that connect the heater block 20*a* and the individual support blocks 31*a* and 32*a* to be low within a range where the heater block 20*a* can be supported without tilting or the like and the pressing force can be transmitted. Accordingly, it is desirable for the rod-like members 50 to be a low number in a range where the rod-like members 50 can be spread out in two dimensions in the up-down and left-right directions on the individual support blocks 31*a* and 31*b*. As described above, it is desirable to use four or three rod-like members 50 per single support block.

As described earlier, one support block 32*a* that is included in the plurality of support blocks 37 that support the heater block 20*a* has a function as a movable support block 39. The other support block 31*a* may also be a movable support block 39, or may be a support block that does not include a sliding mechanism 35 and whose position in the length direction X is fixed to a shaft 66 of the driving mechanism 60.

Although the first support blocks 37 that support one heater block 20*a* have been described above as one example, the second support blocks 38 that support the other heater block 20*b* are the same, so that one out of the individual support blocks 31*b* and 32*b* out of the plurality of second support blocks 38 may be a movable support block 39 or both support blocks 31*b* and 32*b* may be movable support blocks 39.

In addition, in the welding apparatus 1, the molds 10a and 10b, the two heater blocks 20a and 20b, the plurality of rod-like members 50, and the support blocks 31a, 31b, 32a, and 32b can be made of a metal with a low coefficient of thermal expansion, for example, a heat-resistant metal such as carbon steel or stainless steel, which makes it possible to support the molds 10a and 10b without interposing an insulating material such as resin, ceramic, fiber or the like. Accordingly, it is possible to provide the welding apparatus 1 that has less problems, such as thermal expansion, assembly accuracy, and durability, that occur when thermal insulating materials, such as resin, ceramics, and fibers, are used.

The above description discloses the apparatus 1 that welds together a plurality of film-like members 19, and is an apparatus including a pair of molds 10a and 10b that extend in a first direction X and press together and heat an overlapping part of a plurality of film-like members so as to at least partially weld the overlapping part, a pair of heater blocks 20a and 20b that extend in the first direction X so as to support the pair of molds, a plurality of support blocks 30 that are arranged so as to be spread out in the first direction X and transmit a force that presses the pair of molds via the heater blocks, and a plurality of rod-like members 50 that extend in a direction perpendicular to the first direction X so as to connect the heater blocks and the respective support blocks out of the plurality of support blocks. Each member in the plurality of rod-like members 50 midway includes a part 51 that restricts the transmission of heat and the plurality of rod-like members are arranged so as to support the individual support blocks 30 and the heater blocks 20a or 20b at at least three positions.

In the welding apparatus 1, by disposing the support blocks 30 intermittently on the first direction X, the joining positions of the heater block 20a or 20b and the support blocks 30 are limited. In addition, the heater blocks and the individual support blocks are connected via the rod-like members 50 that midway include parts that restrict the transmission of heat. This means that by using the plurality of support blocks 30, it is possible to greatly reduce the flow of heat from the heater block 20a and 20b to the support blocks, the temperature distributions of the heater blocks are made uniform, and thermal deformation of the heater blocks is caused to happen uniformly, so that it is possible to support the heater block so as to uniformly expand in the first direction X that is the length direction due to changes in temperature. Accordingly, it is still possible to suppress any deviation from straightness of the heater blocks 20a and 20b even if the temperature changes. In addition, by arranging the plurality of support blocks 30 so as to be spread out in the first direction X and reducing the total length Ls in the first direction X of the support blocks 30, it is possible to greatly reduce the influence of thermal deformation of the support blocks 30 on the heater blocks 20a and 20b. This means that it is possible to provide a welding apparatus 1 that is equipped with molds 10a and 10b that are long in the first direction X, are free or liberated from warping and the like, and are capable of applying pressure more uniformly to the film-like members to be welded together.

At least one support block out of the plurality of support blocks 30 may include a mechanism 35 that moves in the first direction X corresponding to thermal deformation in the first direction X of the heater blocks 20a and 20b. The plurality of first support blocks 37 that support one heater block 20a include at least one movable support block 39 that includes the moving mechanism 35 and the plurality of second support blocks 38 that support the other heater block 20b may also include at least one movable support block 39.

Since the moving mechanism 35 is incorporated in a support block 39 that has little thermal deformation, it is possible, with a simple configuration, to stably move the support block in response to a change in temperature and possible to reliably absorb thermal expansion of the heater blocks 20a and 20b. This means that it is possible to suppress the generation of stress in the heater blocks 20a and 20b due to thermal deformation, and possible to suppress deformation in the molds 10a and 10b.

The plurality of support blocks 37 and 38 that correspond to one heater block may be constructed by two or three support blocks 30. It is desirable for the support blocks 30 that are arranged so as to be spread out to be low in number. The respective support blocks 30 may be connected to the heater block 20a or 20b to be supported by three or four rod-like members 50 that are arranged intermittently in two dimensions. The rod-like members 50 where the transmission of heat occurs may be low in number within a range where it is possible to stably support the heater blocks 20a and 20b.

Note that although the present invention has been described above by way of an embodiment with a specific configuration, it should be understood that various modifications aside from those described above are also possible without departing from the spirit or scope of the present invention. As one example, it is possible to substitute similar elements for the specific elements that have been illustrated and described within the scope of the present invention that is defined by the range of the attached patent claims, and possible to make use of specified features independently of the other features. In some cases, the specified positions of elements may be reversed or other elements may be interposed.

The invention claimed is:

1. An apparatus that welds together a plurality of film-like members comprising:
   a pair of molds that extend in a first direction and sandwich and heat an overlapping part of the plurality of film-like members to at least partially weld the overlapping parts together;
   a pair of heater blocks that extend in the first direction and support the pair of molds respectively;
   a plurality of first support blocks that are disposed intermittently on the first direction and are connected via a plurality of rod-like members respectively to one heater block out of the pair of heater blocks, wherein the plurality of rod-like members extend in a direction that is perpendicular to the first direction and midway include parts that restrict transmission of heat respectively;
   a plurality of second support blocks that are disposed intermittently on the first direction and are connected via the plurality of rod-like members to another heater block out of the pair of heater blocks; and
   a driving apparatus that changes, via the plurality of first support blocks and the plurality of second support blocks, a distance between the pair of molds to press together the film-like members,
   wherein the plurality of first support blocks include at least one non-movable support block and at least one movable support block including a mechanism to support the one heater block and one of the pair of molds integrally and slidably in the first direction only, relative to the driving apparatus corresponding to thermal deformation in the first direction of a heater block to be supported, and the plurality of second support blocks include at least one non-movable support block and at least one movable support block including a mechanism to support the another heater block and another of the pair of molds integrally and slidably in the first direction only, relative to the driving apparatus corresponding to thermal deformation in the first direction of a heater block to be supported.

2. The apparatus according to claim 1,
wherein each support block in the plurality of first support blocks and the plurality of second support blocks is connected by the plurality of rod-like members that are arranged at three or four locations that are spread out.

3. The apparatus according to claim 1,
wherein the plurality of first support blocks are composed of two or three support blocks that include the at least one movable support block, and
the plurality of second support blocks are composed of two or three support blocks that include the at least one movable support block.

4. The apparatus according to claim 1,
wherein an overall length Lh of one heater block out of the pair of heater blocks and a sum total length Ls of the plurality of first support blocks satisfy a condition below.

$0.05 < Ls/Lh < 0.5$

5. The apparatus according to claim 1,
further comprising a vacuum vessel that houses the pair of molds, the pair of heater blocks, the plurality of first support blocks, and the plurality of second support blocks.

6. The apparatus according to claim 1, wherein the first plurality of support blocks comprises no more than two first support blocks and the second plurality of support blocks comprises no more than two second support blocks.

7. The apparatus according to claim 1, wherein each of the first plurality of support blocks is aligned with a respective shaft of said driving apparatus.

8. The apparatus according to claim 1, said driving apparatus comprising one or more shafts, wherein each of the first plurality of support blocks is coupled with a respective one of said one or more shafts.

9. The apparatus according to claim 1, said movable support block movable relative to the driving apparatus.

10. The apparatus according to claim 1, wherein each of said plurality of first support blocks and second support blocks have a plurality of rod-like members.

* * * * *